United States Patent
Labuhn et al.

(10) Patent No.: US 8,423,259 B2
(45) Date of Patent: Apr. 16, 2013

(54) DRIVER INPUTS ALLOWING FULL SPEED RANGE ADAPTIVE CRUISE CONTROL TO RELEASE BRAKE HOLD

(75) Inventors: Pamela I. Labuhn, Shelby Township, MI (US); James Heath Holbrook, Fenton, MI (US); William J. Chundrlik, Jr., Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 557 days.

(21) Appl. No.: 12/432,489

(22) Filed: Apr. 29, 2009

(65) Prior Publication Data

US 2010/0280728 A1  Nov. 4, 2010

(51) Int. Cl.
 *B60T 8/32* (2006.01)
(52) U.S. Cl.
 USPC .............. 701/93; 701/96; 180/170; 123/349; 340/441
(58) Field of Classification Search ............... 340/425.5, 340/500; 701/93, 91, 96; 180/167, 168, 180/170, 171, 123, 349
See application file for complete search history.

(56) References Cited

U.S. PATENT DOCUMENTS

| | | | |
|---|---|---|---|
| 6,416,110 B1 * | 7/2002 | Haecker et al. | 296/107.01 |
| 7,027,920 B2 * | 4/2006 | Madau | 701/301 |
| 7,099,766 B2 * | 8/2006 | Michi et al. | 701/96 |
| 7,117,077 B2 * | 10/2006 | Michi et al. | 701/96 |
| 7,178,819 B2 * | 2/2007 | Scherl et al. | 180/170 |
| 7,337,056 B2 * | 2/2008 | Arai | 701/96 |
| 7,561,954 B2 * | 7/2009 | Aizawa et al. | 701/79 |
| 7,565,235 B2 * | 7/2009 | Okada et al. | 701/96 |
| 2004/0193354 A1 * | 9/2004 | Dunoyer et al. | 701/96 |
| 2005/0149247 A1 * | 7/2005 | Kuramochi et al. | 701/96 |
| 2007/0142994 A1 * | 6/2007 | Boecker et al. | 701/93 |

* cited by examiner

*Primary Examiner* — Nicole Verley
(74) *Attorney, Agent, or Firm* — Ingrassia Fisher & Lorenz, P.C.

(57) ABSTRACT

A method for implementing adaptive cruise control for a vehicle includes the steps of stopping the vehicle, determining whether a driver of the vehicle has taken a deliberate action to move the vehicle, and moving the vehicle, on the condition that the driver has taken the deliberation action to move the vehicle.

15 Claims, 8 Drawing Sheets

DRIVER INPUTS ALLOWING FULL SPEED RANGE ADAPTIVE CRUISE CONTROL TO RELEASE BRAKE HOLD

TECHNICAL FIELD

The present invention relates generally to vehicles and, more particularly, to a method and system for improved adaptive cruise control for vehicles.

BACKGROUND OF THE INVENTION

Adaptive cruise control maintains a driver-selected vehicle speed or maintains a driver-selected headway to a preceding licensable vehicle moving slower than the driver-selected vehicle speed. Adaptive cruise control automatically switches between speed control and headway control based on the presence of a preceding licensable vehicle moving slower than the driver-selected vehicle speed. Speed control and headway control are accomplished by powertrain control (e.g. adjusting the throttle) or applying limited automatic braking.

Adaptive cruise control can be engaged by the driver using the cruise control switches when vehicle speed is above a minimum engagement speed, for example twenty-five miles per hour (MPH). When speed drops below a minimum value, for example twenty MPH, adaptive cruise control begins to disengage. While adaptive cruise control is disengaging, automatic braking can continue to be applied but adaptive cruise control does not accelerate the vehicle.

Full speed range adaptive cruise control (FSRA) extends the operation of adaptive cruise control down to a stop. Once FSRA brings the vehicle to a complete stop, the vehicle will remain stopped until the driver indicates it is alright to go. The driver accomplishes this by pressing the accelerator pedal or by pressing a cruise resume switch. Like adaptive cruise control, FSRA is a convenience feature that is designed to follow vehicles. When FSRA has brought the vehicle to a stop, the driver is responsible for indicating the path ahead is clear of objects, for example pedestrians, that may not be detected by the FSRA system.

Adaptive cruise control has been designed to allow the driver to be considered part of the hazard mitigation strategy. Part of this design limits the vehicle acceleration and deceleration capabilities so the driver can take over when needed. The low speed operation of FSRA also assumes the driver would be able to override the system. This includes low speed operation following the vehicle coming to a complete stop. However, because there is potential for the driver to get out of the vehicle or be out of position, for example, reaching in the back seat, while the FSRA system is holding the vehicle at a stop, it may be desirable to provide improved techniques to help ensure that only pre-defined deliberate driver actions allow the FSRA system to release the brake hold and/or to help ensure that failure modes are not inadvertently interpreted as valid driver actions leading to release of FSRA from a stop.

Accordingly, it is desirable to provide an improved method for implementing adaptive cruise control for vehicles, for example that helps to ensure that only pre-defined deliberate driver actions allow the FSRA system to release the brake hold and/or that helps to ensure that failure modes are not inadvertently interpreted as valid driver actions leading to release of FSRA from a stop. It is also desirable to provide an improved program product for such improved implementations of adaptive cruise control. It is further desirable to provide an improved system for such improved implementations of adaptive cruise control. Furthermore, other desirable features and functions of the present invention will become apparent from the subsequent detailed description of the invention and the appended claims, taken in conjunction with the accompanying drawings and this background of the invention.

SUMMARY OF THE INVENTION

In accordance with an exemplary embodiment of the present invention, a method for implementing adaptive cruise control for a vehicle is provided. The method comprises the steps of stopping the vehicle, determining whether a driver of the vehicle has taken a deliberate action to move the vehicle, and moving the vehicle, on the condition that the driver has taken the deliberation action to move the vehicle.

In accordance with another exemplary embodiment of the present invention, a program product for implementing adaptive cruise control for a vehicle is provided. The program product comprises a program and a computer-readable signal bearing medium. The program is configured to at least facilitate stopping the vehicle, determining whether a driver of the vehicle has taken a deliberate action to move the vehicle, and moving the vehicle, on the condition that the driver has taken the deliberation action to move the vehicle. The computer-readable signal bearing medium bears the program.

In accordance with a further exemplary embodiment of the present invention, a computer system for implementing adaptive cruise control for a vehicle is provided. The computer system comprises a memory and a processor. The memory is configured to store an adaptive cruise control program. The adaptive cruise control program is configured to at least facilitate stopping the vehicle, determining whether a driver of the vehicle has taken a deliberate action to move the vehicle, and moving the vehicle, on the condition that the driver has taken the deliberation action to move the vehicle. The processor is coupled to the memory, and is configured to execute the adaptive cruise control program.

DESCRIPTION OF THE DRAWINGS

The present invention will hereinafter be described in conjunction with the following drawing figures, wherein like numerals denote like elements.

DETAILED DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
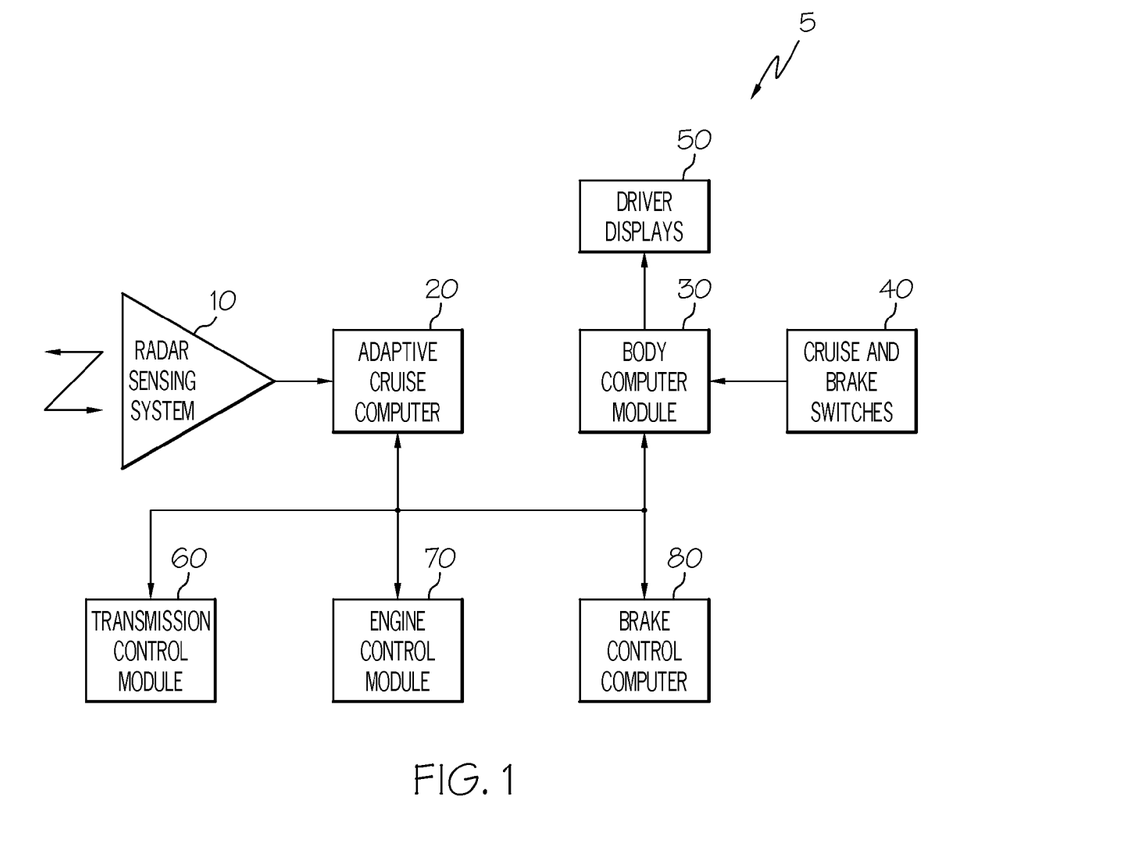
FIG. 1 is a functional block diagram of an adaptive cruise control system, in accordance with an exemplary embodiment of the present invention.

FIG. 1 is a functional block diagram of an adaptive cruise control system 5, in accordance with an exemplary embodiment of the present invention. In a preferred embodiment, the adaptive cruise control system 5 comprises a full speed range adaptive cruise control system. In the depicted embodiment, the adaptive cruise control system 5 comprises a radar sensing system 10, an adaptive cruise computer 20, a body computer module (BCM) 30, cruise and brake switches 40, one or more driver displays 50, a transmission control module (TCM) 60, an engine control module (ECM) 70, and a brake control computer 80. Various other components may be utilized in other embodiments.

The adaptive cruise computer 20, the BCM 30, the transmission control module 60, the engine control module 70, and the brake control computer 80 share information on a high speed serial data link. In a preferred embodiment, the BCM 30 reads the state of the cruise and brake switches 40 and sends their status to an adaptive cruise control module on the serial data link. The cruise switches preferably comprise an on/off switch, a set switch, a resume switch and possibly a cancel switch.

The adaptive cruise computer 20 preferably uses the cruise and brake switch status to determine whether adaptive cruise control should be engaged and to determine the driver-selected speed. The adaptive cruise computer 20 also preferably obtains data from the radar sensing system 10 indicating the distance and relative speed of vehicles ahead in the path of the FSRA vehicle. When FSRA is engaged, the adaptive cruise computer 20 sends commands to the ECM 70 and the brake control computer 80 to control the speed of the FSRA vehicle based on the data from the radar sensor concerning the vehicle ahead and based on the driver-selected speed. The adaptive cruise computer 20 sends information to the driver displays 50 via the BCM 30 to indicate the status of the system to the driver.

FIGS. 2-7 depict a process 90 for implementing adaptive cruise control, in accordance with an exemplary embodiment of the present invention. In a preferred embodiment, the process 90 is utilized in connection with the adaptive cruise computer 20 of FIG. 1 and/or in connection with program products and/or software, for example as described further below in connection FIG. 8, for full speed range adaptive cruise control.

Figure 2:
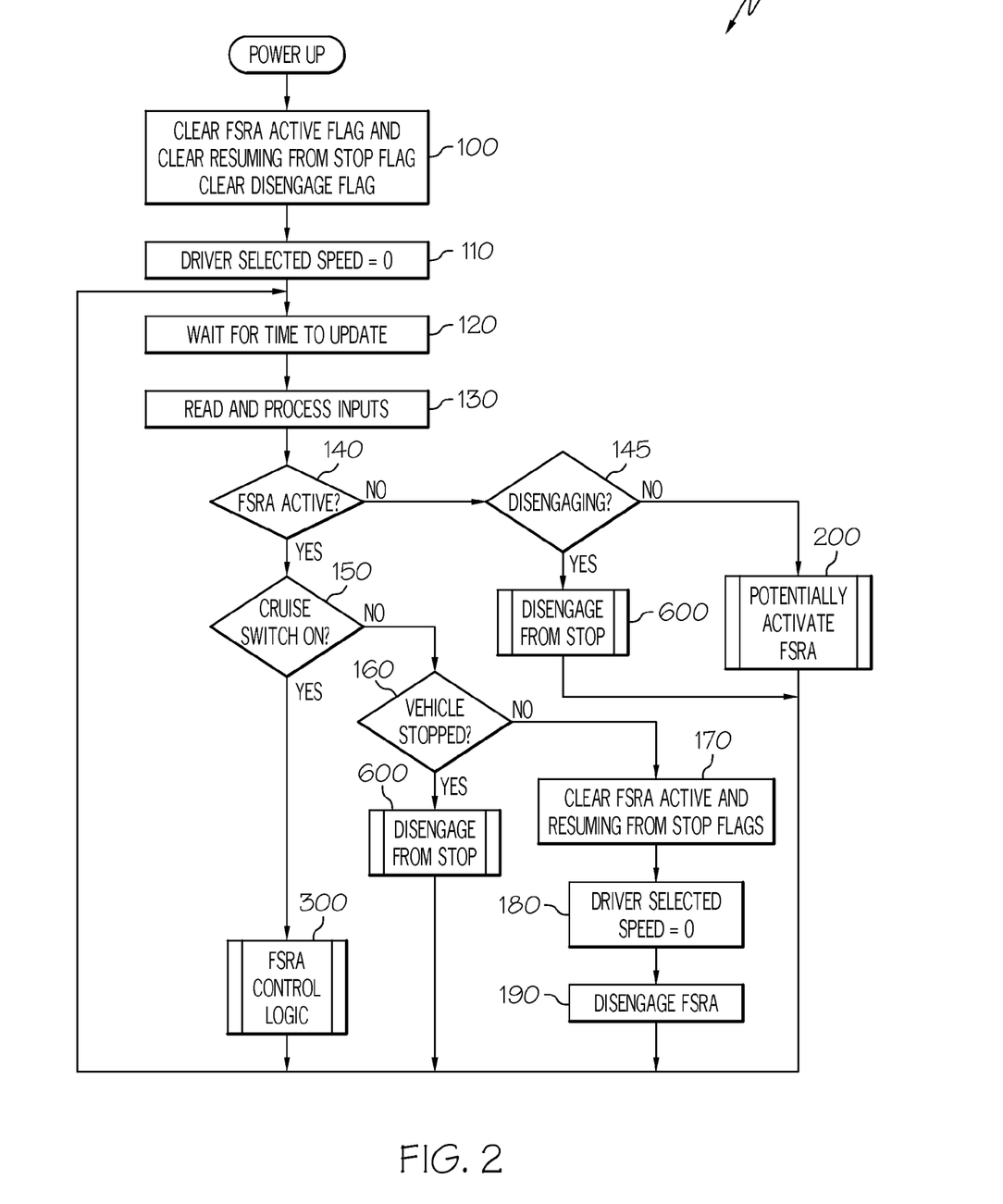
FIGS. 2-7 are flowcharts depicting methods for implementing adaptive cruise control for vehicles, and steps thereof, in accordance with an exemplary embodiment of the present invention.

As depicted in FIG. 2, the process 90 begins with step 100. During step 100, an FSRA Active flag, a Resuming from Stop flag, and a Disengage Flag are each cleared. Next, at step 110, a driver selected speed is set equal to zero. In a preferred embodiment, driver selected speed represents a speed that the adaptive cruise computer 20 attempts to control to when FSRA is active and there is no other vehicle ahead in close proximity to the vehicle.

The process 90 then proceeds to step 120, in which the process waits until it is time to execute the algorithm. The algorithm is intended to execute at a periodic rate such as every fifty milliseconds in one preferred embodiment; however, this may vary in other embodiments.

When it is time for the algorithm to execute, the process proceeds to step 130. During step 130, inputs needed by the algorithm are read and processed. These inputs are preferably provided by other modules, such as the TCM 60, the ECM 70, the brake control computer 80, and the BCM 30 of FIG. 1 via serial communications. The cruise and brake switches 40 of FIG. 1 are preferably read by the BCM 30 and sent to the adaptive cruise computer 20 of FIG. 1 via serial communications. Inputs from other modules preferably include electric park brake status, radar data (preferably obtained from the radar sensing system 10) and vehicle speed, among any number of various other possible different types of outputs from any number of other different modules.

After the inputs are read, a check is conducted as to whether FSRA is active (step 140). In a preferred embodiment, this check is conducted by the adaptive cruise computer 20 of FIG. 1.

If it is determined in step 140 that FSRA is not active, then the process proceeds to step 145, in which a check is conducted as to whether FSRA is in the process of disengaging. In a preferred embodiment, this check in step 145 is equivalent to checking that the Disengage flag (referred to at step 100) is set. In a preferred embodiment, the Disengage flag will only be set if FSRA is in the process of disengaging with the FSRA vehicle being held at a stop.

Figure 7:
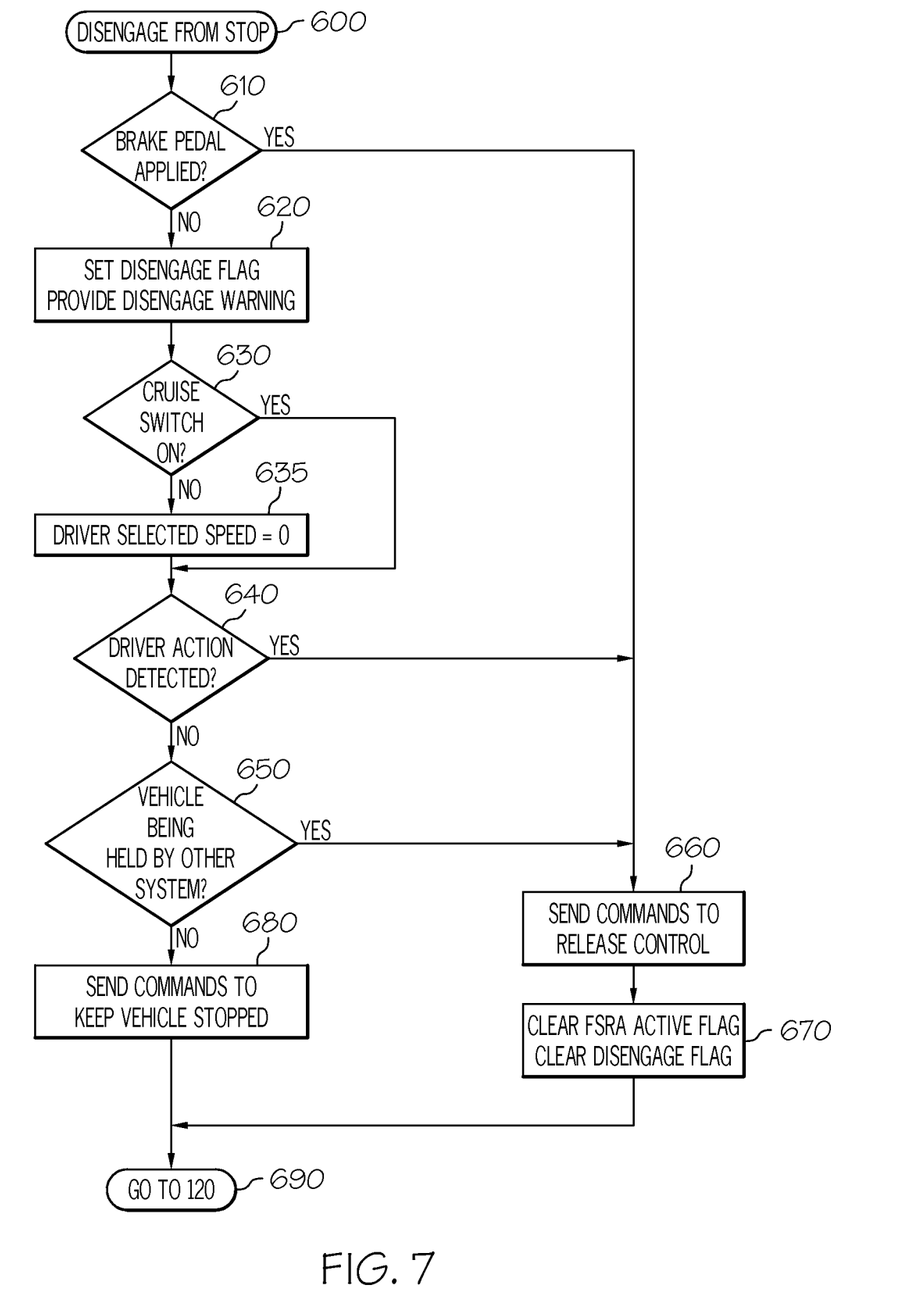

If it is determined in step 145 that the Disengage flag is set, then the process proceeds to step 600. During step 600, a disengagement from the stop is executed in accordance with disengagement logic from step 600 in accordance with an exemplary embodiment of the present invention. An exemplary embodiment of this step 600 is depicted in FIG. 7, and will be described in greater detail below in connection therewith.

Figure 3:
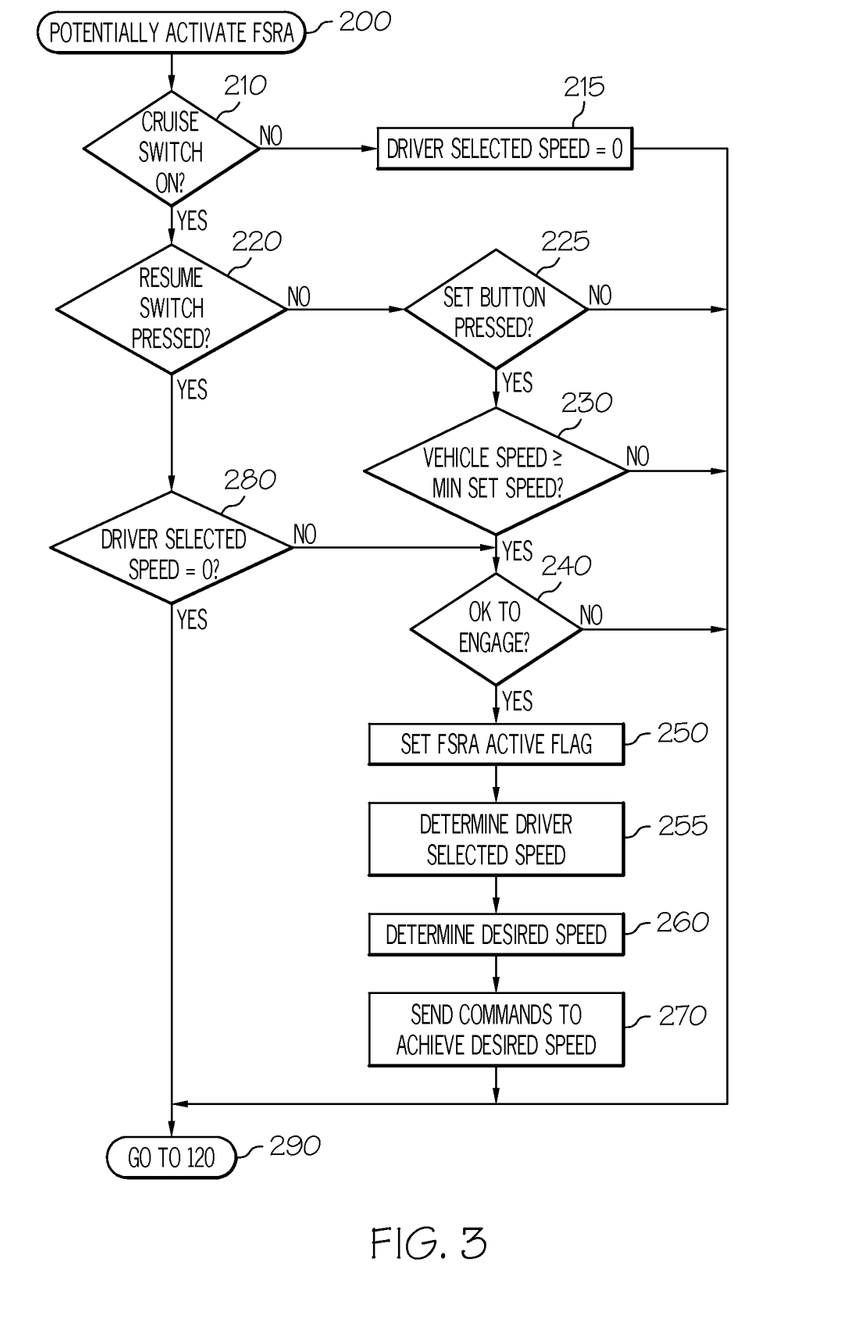

Conversely, if it is determined in step 145 that the Disengage flag is not set, then the process proceeds instead to step 200. During step 200, the FSRA is potentially activated. An exemplary embodiment of this step 200 is depicted in FIG. 3, and will be described in greater detail below in connection therewith.

Otherwise, if it is determined in step 140 that FSRA is active, then the process proceeds to step 150. During step 150, a check is conducted as to whether the cruise on/off switch is on. In one exemplary embodiment in which the adaptive cruise control system has a latching cruise on/off switch, the position of the switch will preferably indicate whether it is on. In another exemplary embodiment in which the adaptive cruise control system has a momentary on/off switch, a module, for example the ECM 70 of FIG. 1, determines whether the switch is considered on or off.

Figure 4:
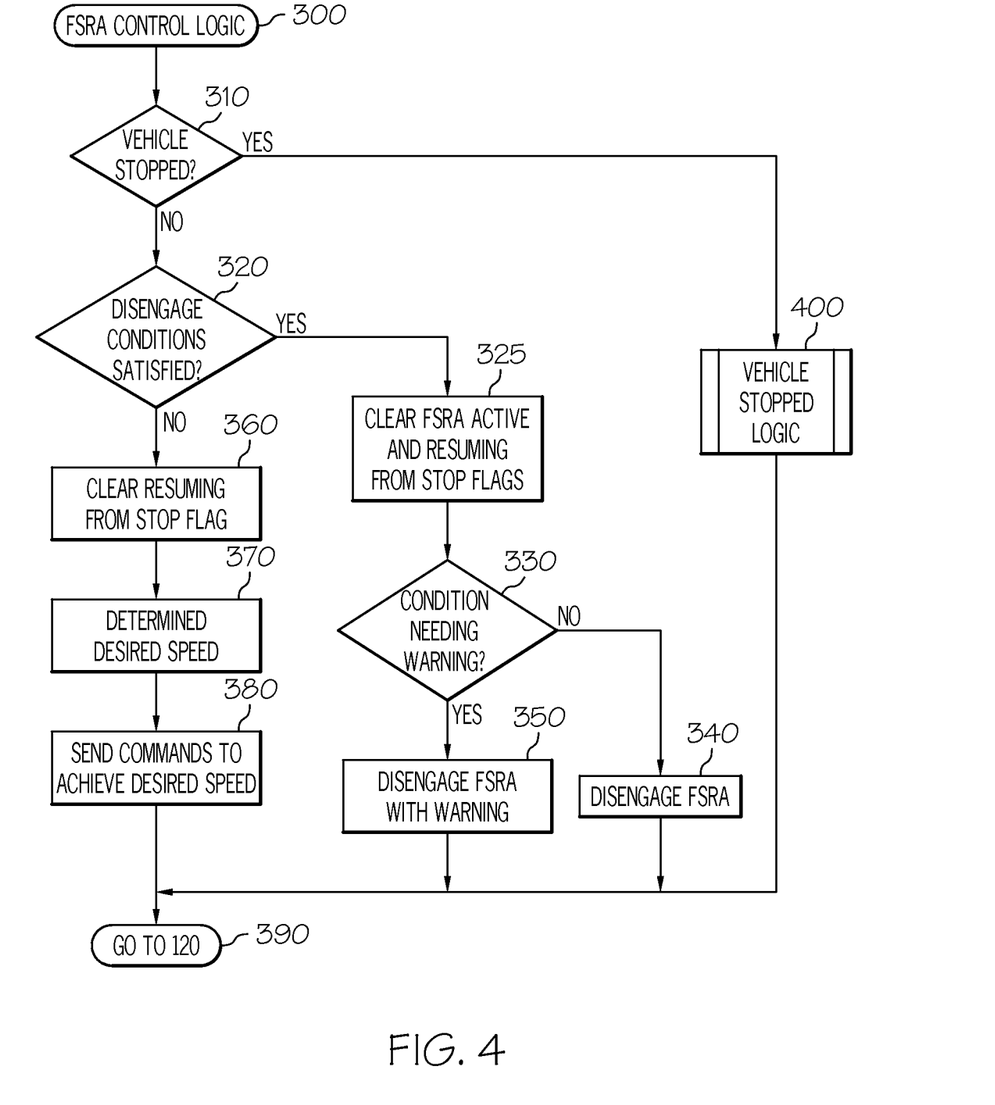

If it is determined in step 150 that the cruise switch is on, then the process proceeds to step 300. During step 300, FSRA control logic is executed. An exemplary embodiment of this step 300 is depicted in FIG. 4, and will be described in greater detail below in connection therewith.

Conversely, if it is determined in step 150 that the cruise switch is not on, then the process proceeds instead to step 160. During step 160, a determination is made as to whether the vehicle is stopped or moving.

If it is determined in step 160 that the vehicle is moving, the process proceeds to step 170. During step 170, the FSRA active flag and the Resuming from Stop flag are both cleared. Next, the driver selected speed is set equal to zero (step 180), and the FSRA is disengaged (step 190). In a preferred embodiment, the FSRA is disengaged by sending appropriate commands to release the brakes (if applied) and release powertrain control. The process then returns to step 120 to wait for the next periodic update time.

Conversely, if it is determined in step 160 that the vehicle is stopped, then the process proceeds instead to the above-referenced step 600. During step 600, FSRA is disengaged, preferably with a warning and subsequent driver action as described in FIG. 7 and discussed in greater detail further below in connection therewith.

Turning now to FIG. 3, a flowchart of the logic of step 200 of FIG. 2 to potentially activate the FSRA is provided in accordance with an exemplary embodiment of the present invention. In a preferred embodiment, this is the logic that is executed if FSRA is not active and is not in the process of disengaging. This logic is intended to activate FSRA if the driver is trying to engage FSRA and conditions allow it to be engaged.

As depicted in FIG. 3, a determination is made as to whether a cruise on/off switch is on (step 210). If it is determined in step 210 that the cruise switch is not on, then the driver selected speed is cleared (step 215), and then the process returns back to step 120 to wait for the next periodic update time.

Conversely, if it is determined in step 210 that the cruise on/off switch is on, then a determination is made as to whether the resume switch has been pressed (step 220). If it is determined in step 220 that the resume switch has been pressed, then the process proceeds to step 280, in which a determination is made as to whether there is a speed to resume to, or, in other words, a determination as to whether the driver selected speed is equal to zero.

If it is determined in step 280 that the driver selected speed is equal to zero, there is no speed to resume to and the resume input is ignored by returning to step 120 of FIG. 2 to wait for the next update time. Conversely, if it is determined in step 280 that the driver selected speed is not equal to zero, the process proceeds instead to step 240, in which a determination is made as to whether it is acceptable to engage FSRA. In a preferred embodiment, the determination of whether it is acceptable to engage FSRA includes steps such as, for example, determinations as to whether all the sensors providing input data are working properly, whether the key modules on the serial data link are communicating properly, whether the ECM 70 and brake control computer 80 of FIG. 1 indicate that they can respond to adaptive cruise control requests for acceleration and braking, and/or whether special checks are satisfied such as the brake pedal not being currently applied but having been seen previously to be applied, among various other possible steps.

If it is determined in step 240 that it is not acceptable to engage FSRA, then FSRA will not be engaged, and the process proceeds to step 120 to wait for the next time the algorithm runs. Conversely, if it is determined in step 240 that it is acceptable to engage FSRA, then FSRA is engaged by executing steps 250, 255, 260 and 270 before proceeding to step 120 to wait for the next time the algorithm runs. Specifically, in step 250, the FSRA active flag is set. Then, at step 255, the driver selected speed is determined. In a preferred embodiment, the resume switch was used to engage FSRA, thus the driver selected speed is not changed. During step 260, the desired speed is determined. In a preferred embodiment, the desired speed comprises either (i) the driver selected speed, if there is no other vehicle ahead, or (ii) the speed needed (at least at this point) to reach the desired following distance or to stop behind the vehicle ahead once it has stopped. Next, during step 270, the appropriate commands are sent to the powertrain and brake controllers to get to the desired speed.

Returning now to step 220, if it is determined that the resume switch is not pressed, then a determination is made as to whether the set button pressed (step 225). If it is determined in step 225 that the set button is not pressed, then this indicates that the driver has not tried to engage FSRA. Accordingly, the process then returns to step 120 to wait for the next update time and the process is repeated.

Conversely, if it is determined in step 225 that the set button is pressed, then the process proceeds to step 230, and a determination is made as to whether the vehicle speed is greater than or equal to the Min Set Speed. In one preferred embodiment, the Min Set Speed is typically twenty five miles per hour (MPH). However, this may vary in other embodiments.

If it is determined in step 230 that the vehicle speed is not greater than or equal to the Min Set Speed, then the FSRA will not be engaged, and the set button press will be ignored and the logic returns to step 120 to wait for the next update time. Conversely, if it is determined in step 230 that the vehicle speed is greater than or equal to Min Set Speed, then the process proceeds instead to 240, and a determination is made as to whether it is acceptable to engage FSRA, for example as discussed above. If a determination is made during step 240 that it is acceptable to engage FSRA, then FSRA is engaged by executing steps 250, 255, 260 and 270 before returning to step 120 to wait for the next time the algorithm runs. At step 250, the FSRA active flag is set.

Specifically, during step 255, the driver selected speed is determined. In a preferred embodiment, the set button was used to engage FSRA, and thus the driver selected speed is set to a value close to the current vehicle speed. At step 260, the desired speed is determined. In a preferred embodiment, the desired speed comprises either (i) the driver selected speed, if there is no other vehicle ahead in close proximity, or (ii) the speed needed (at least at this point) to get to the desired following distance or to stop behind the vehicle ahead once it has stopped. At step 270, the appropriate commands are sent to the powertrain and brake controllers to reach the desired speed.

Conversely, if it is determined in step 240 that it is not acceptable to engage FSRA, then algorithm ignores the switch input. In addition, in such event, the process returns to step 120 to wait for the next update time.

Turning now to FIG. 4, a flowchart of the FSRA control logic of step 300 of FIG. 2 is provided in accordance with an exemplary embodiment of the present invention. In a preferred embodiment, this is the logic that is executed if FSRA was active when checked at step 140 of FIG. 2 and the cruise switch is on.

Figure 5:
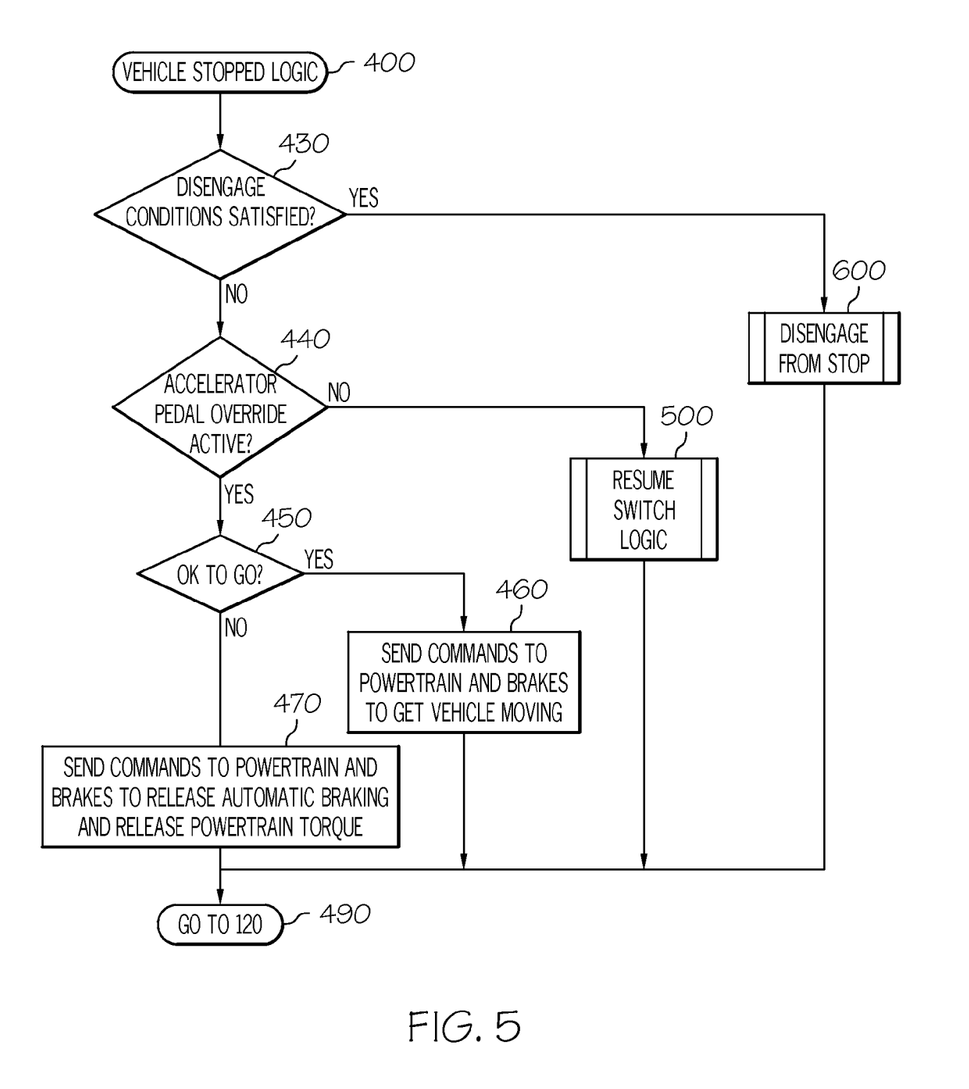

In the depicted embodiment, the logic checks at step 310 whether the FSRA vehicle is stopped. If it is determined in step 310 that the vehicle is stopped, the Vehicle Stopped Logic is executed at step 400 before returning to step 120 to wait for the next update time. The vehicle stopped logic is shown in FIG. 5 in accordance with an exemplary embodiment, and will be described in greater detail further below in connection therewith.

Conversely, if it is determined in step 310 that the vehicle is not stopped, then disengagement conditions are checked (320), preferably by the adaptive cruise computer 20 of FIG. 1, to help make sure that FSRA should remain engaged. In a preferred embodiment, the disengagement conditions checked at step 320 include whether the driver is pressing the brake pedal, whether the brake control computer 80 of FIG. 1 indicates that it will not be able to perform automatic braking if requested by the adaptive cruise computer 20, whether input sensors are not functioning properly, and/or one or more of any number of other determinations.

If it is determined in step 320 that a disengagement condition is satisfied, the FSRA active and resuming from stop flags are cleared (step 325). Then the disengagement condition is checked (step 330) to see whether a driver warning is required.

If it is determined in step 330 that a driver warning is not needed, FSRA is disengaged (step 340). In one exemplary embodiment, pressing the brake pedal is an example of a disengagement not needing a warning. Once FSRA is disengaged at step 340, the process proceeds to step 120 to wait for the next update time.

Conversely, if it is determined in step 330 that the condition does require a warning, the warning is given and FSRA is disengaged (350). In one preferred embodiment, this step involves continuing braking (if automatic braking was active when the disengagement condition was detected) until a period of time passes or the driver takes control. Once FSRA is disengaged at step 350, the logic proceeds to step 120 to wait for the next update time.

Conversely, if it is determined in step 320 that no disengagement condition is satisfied, then the logic proceeds instead to step 360, in which the resuming from stop flag is cleared, as the vehicle is not stopped. Then, during step 370, the desired speed is determined. In a preferred embodiment, the desired speed comprises either (i) the driver selected speed, if there is no vehicle ahead, or (ii) the speed needed (at least at this point) to get to the desired following distance or to stop behind the vehicle ahead once it has stopped. Next, during step 380, the appropriate commands are sent to the powertrain and brake controllers to get to the desired speed before proceeding to step 120 to wait for the next update time.

Turning now to FIG. 5, the vehicle stopped logic (referenced as step 400, as noted above) is depicted, and will now be described in connection therewith, in accordance with an exemplary embodiment of the present invention. In a preferred embodiment, this vehicle stopped logic is executed if FSRA is active and holding the vehicle at a stop.

As depicted in FIG. 5, the vehicle stopped logic begins at step 430 by checking whether any disengagement condition is satisfied. In a preferred embodiment, these conditions include conditions such as whether the cancel switch is being pressed, whether the brake pedal is being pressed, whether serial communications are not operating properly, whether input sensors are not operating properly, whether the brake control computer 80 of FIG. 1 is indicating that it cannot respond to commands for braking (or hold vehicle at a stop), whether the engine control module 70 is indicating that it cannot respond to adaptive cruise control commands (or determine accelerator pedal override), and/or one or more of a number of other different possible conditions.

If it is determined in step 430 that any of the disengagements are satisfied, then the logic proceeds to step 600 to disengage from stop before returning to step 120 to wait for the next update time. The logic for Disengage from Stop is depicted in the flowchart of FIG. 7, and will be descried further below in greater detail in connection therewith, in accordance with an exemplary embodiment of the present invention.

If it is determined in step 430 that no disengagement conditions are satisfied, then the logic proceeds to step 440, in which a determination is made as to whether the accelerator pedal override is active. In a preferred embodiment, in step 440, the engine control module (ECM) 70 of FIG. 1 reads the accelerator pedal inputs and determines whether the driver is overriding the adaptive cruise control. Because the vehicle is stopped, overriding the adaptive cruise control simply means, in a preferred embodiment, that the driver is pressing the accelerator pedal. Also in a preferred embodiment, the ECM 70 provides the accelerator pedal override active information to the adaptive cruise computer 20 and the brake control computer 80 of FIG. 1.

Figure 6:
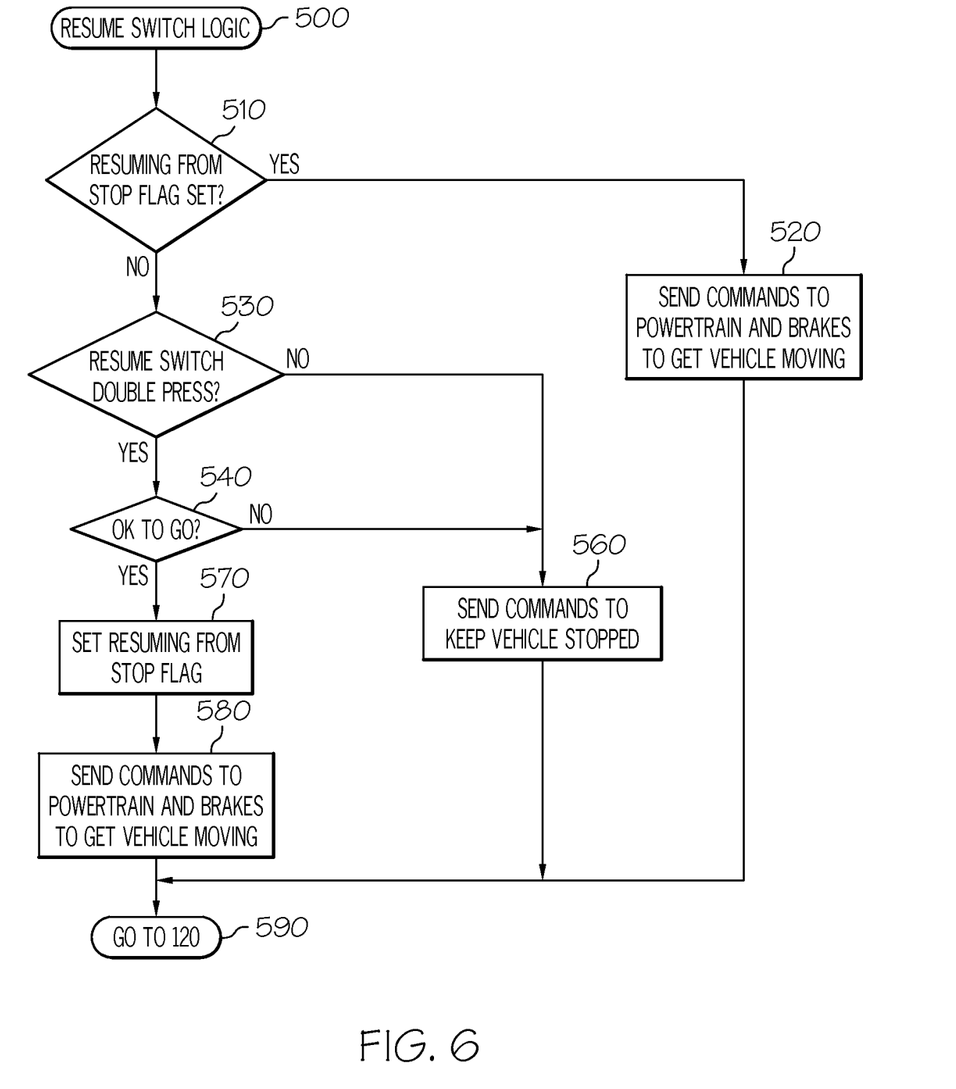

If it is determined in step 440 that an accelerator pedal override is not active, then the logic proceeds to step 500 to execute the Resume Switch Logic. The Resume Switch Logic is depicted in FIG. 6 and described further below in accordance with an exemplary embodiment of the present invention.

Conversely, if it is determined in step 440 that the accelerator pedal override is active, then the logic proceeds instead to step 450 to check whether it is acceptable for the vehicle to proceed forward. In a preferred embodiment, the adaptive cruise computer 20 of FIG. 1 checks conditions of any objects ahead detected by the radar sensing system 10 to determine if it is acceptable for the vehicle to proceed forward. This check preferably includes the distance and speed of the objects detected and their position relative to the projected path of the FSRA vehicle. In a preferred embodiment, the projected path of the FSRA vehicle is straight in front of the FSRA vehicle, in other words, where the vehicle would go if it started moving. In a preferred embodiment, if there are no objects in the projected path of the FSRA vehicle or the objects in the path are far enough away and/or moving away, the adaptive cruise computer 20 will consider it acceptable for the vehicle to proceed forward.

If it is determined in step 450 that it is not acceptable for the vehicle to proceed forward, commands are sent at step 470 to the brake control computer 80 and the ECM 70 of FIG. 1 to release automatic braking and to release powertrain torque. The ECM 70 of FIG. 1 preferably applies torque based on the accelerator pedal because adaptive cruise control is not asking for any. The logic then proceeds back to step 120 to wait for the next update time.

Conversely, if it is determined in step 450 (preferably by the adaptive cruise computer 20 of FIG. 1) that it is acceptable for the vehicle to proceed forward, commands are sent at step 460 to the powertrain and brakes to get the vehicle moving before returning to step 120 to wait for the next update time.

Turning now to FIG. 6, the resume switch logic (referenced as step 500, as noted above) is depicted, and will now be described in connection therewith, in accordance with an exemplary embodiment of the present invention. In a preferred embodiment, this resume switch logic is the logic that is executed if FSRA is active, the vehicle is stopped and an accelerator pedal override is not active (in other words, when the driver is not pressing the accelerator pedal, in a preferred embodiment).

As depicted in FIG. 6, the resume switch logic begins with step 510, in which a determination is made as to whether the Resuming from Stop flag is set. In a preferred embodiment, this flag will be set (as described below) if a double press of the resume switch had previously been seen by the adaptive cruise computer 20 of FIG. 1 while the vehicle was stopped and it is acceptable for the vehicle to proceed forward.

If it is determined in step 510 that the Resume from Stop flag is set, the logic proceeds to step 520 to send commands to the powertrain and brakes to get the vehicle moving. Otherwise, the flag is not set and step 530 is executed instead, as described directly below.

During step 530, the adaptive cruise computer 20 of FIG. 1 checks for a double press of the resume switch. In a preferred embodiment, a double press of the resume switch comprises two presses of the resume switch, preferably using criteria that include the length of time of the presses and the time between the presses. For example, in one preferred embodiment, a double press of the resume switch is deemed to have occurred if the resume switch is pressed two or more times for at least a first predetermined amount of time each, with at least two of the presses occurring within a second predetermined amount of time of one another. By checking for such a double press of the resume switch, the process 200 helps to ensure that a deliberate driver action has occurred rather than an accidental press or a failure mode.

If it is determined in step 530 that a double press of the resume switch has not occurred, then the process proceeds to step 560, in which the adaptive cruise computer 20 of FIG. 1 sends commands to the powertrain and brake system to keep the vehicle stopped before returning to step 120 to wait for the next update time. Conversely, if it is determined in step 530 that a double press of the resume switch has occurred, then the process proceeds instead to step 540. During step 540, a determination is made as to whether if it is acceptable for the vehicle to proceed forward. In a preferred embodiment, this determination as to whether it is acceptable for the vehicle to proceed forward at step 540 is the same as the check at step 450 of FIG. 5, which has already been described.

If it is determined in step 540 that it is acceptable for the vehicle to proceed forward, the logic proceeds to step 570 to set the Resuming from Stop flag and then to step 580 to send commands to the powertrain and brakes to get the vehicle moving. The commands are preferably sent to the ECM 70 and the brake control computer 80 of FIG. 1. These commands preferably ramp out the brakes and start slowly accelerating the vehicle.

Otherwise, if it is determined in step 540 that it is not acceptable for the vehicle to proceed forward at step 540, the process instead proceeds to step 560. During step 560, the adaptive cruise computer 20 of FIG. 1 sends commands to the powertrain and brake system to keep the vehicle stopped. Whether steps 570 and 580 are executed or step 560 is instead executed, the logic then proceeds back to step 120 to wait for the next time the algorithm is executed.

Turning now to FIG. 7, the disengage from stop logic (referenced as step 600, as noted above) is depicted, and will now be described in connection therewith, in accordance with an exemplary embodiment of the present invention. In a preferred embodiment, this disengage from stop logic is the logic that is executed if FSRA is holding the vehicle at a stop when a disengagement condition becomes active.

As depicted in FIG. 7, the disengage from stop logic begins with step 610, in which a determination is made as to whether the brake pedal is being applied. If it is determined in step 610 that the brake pedal is being applied, then the logic proceeds to step 660 to release the FSRA control or, in other words, to ramp out automatic braking. Next the Disengage flag is cleared at step 670, after which the logic returns to step 120 to wait for the next periodic update of the algorithm.

Conversely, if it is determined in step 610 that the brake pedal is not being applied, then the logic proceeds instead to step 620. During step 620, the Disengage flag is set, and a warning is provided to the driver to indicate the system is disengaging. In a preferred embodiment, the disengage flag will remain set until the driver takes control or the vehicle is being held at a stop by another vehicle system such as an electric park brake of the vehicle. Also in a preferred embodiment, the driver warning is intended to let the driver know the system is disengaging so he/she will be prepared to take control. The warning can be audible, visual, haptic or any combination of these.

Next, the cruise on/off switch is checked (step 630). If it is determined in step 630 that the cruise switch is off, the driver selected speed is cleared (step 635). Whether the driver selected speed is cleared or not, the logic continues to step 640. During step 640, the system looks for a driver action that indicates the driver is taking control.

In a preferred embodiment, the driver actions being checked for at step 640 include accelerator pedal apply and transmission shifted to park. If any of these actions is detected, the driver is considered to have taken control so FSRA can release its control. In a preferred embodiment, the cancel switch can be considered one of these actions, but preferably only if a cancel switch press is what caused FSRA to begin disengaging. This helps to ensure that a deliberate driver action is detected before allowing the brakes to release, thus requiring that the cancel switch be pressed twice. Pressing the cancel switch twice is not likely to be able to be caused by a failure mode or by an accidental press. Similarly, the cruise on/off switch indicating the switch is off is not included as one of the conditions being checked for at step 640. This is because cruise switch failure modes are designed to look as though the on/off switch has been switched off.

If a driver action is detected during step 640, the logic then proceeds to step 660 to release the FSRA control or, in other words, to ramp out automatic braking. Next, the FSRA Active flag and the Disengage flag are cleared (step 670), after which the logic returns to step 120 to wait for the next periodic update of the algorithm.

Conversely, if it is determined in step 640 that none of the defined driver actions are detected, then the logic proceeds instead to step 650. During step 650, a determination is made as to whether the vehicle is being held by another system.

If it is determined in step 650 that another system is holding the vehicle at a stop, the control will be released at step 660, and the FSRA Active and Disengage flags will be cleared at step 670 before returning to step 120 to wait for the next periodic update of the algorithm. In one exemplary embodiment, the electric park brake being applied by the brake system to hold the stop is example of one such other system holding the vehicle at a stop. When another system has taken over holding the vehicle at a stop, FSRA can relinquish control to the other system which will have its own criteria on how the driver can get the vehicle moving again.

Figure 8:
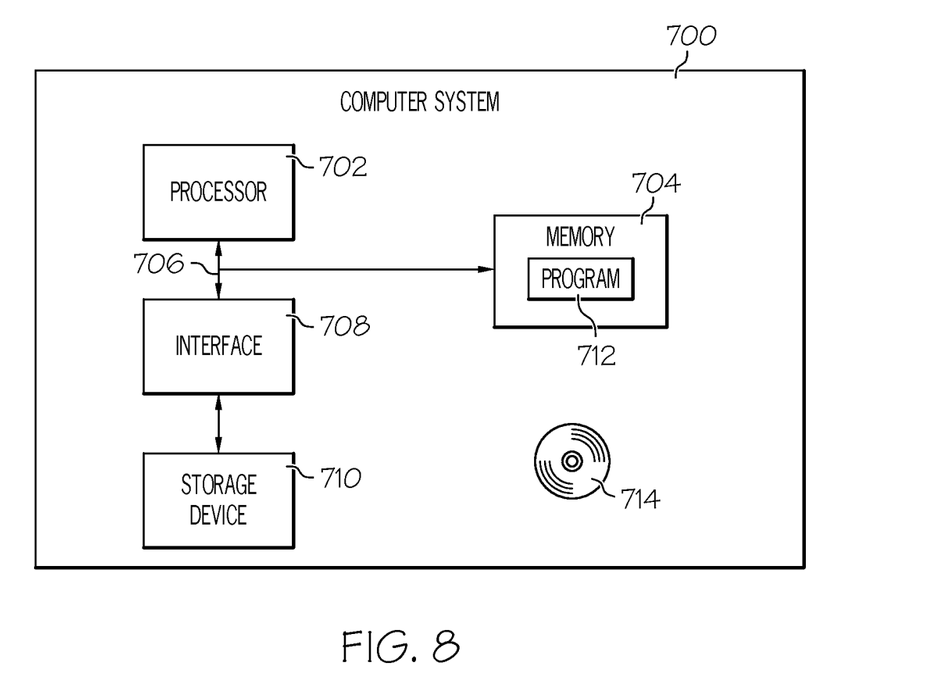
FIG. 8 is a functional block diagram of a computer system that can be utilized in connection with the adaptive cruise control system of FIG. 1 and the methods of FIGS. 2-7, in accordance with an exemplary embodiment of the present invention.

Conversely, if it is determined in step 650 that another system is not holding the vehicle at a stop, then the logic proceeds instead to step 680. During step 680, commands are sent to the brake system to keep the vehicle stopped. The logic then proceeds back to step 120 to wait for the next update of the algorithm FIG. 8 is a functional block diagram of a computer system 700 that can be utilized in connection with the adaptive cruise control system 100 of FIG. 1 and/or various components thereof, and/or the process 200 of FIGS. 2-7 and/or various steps thereof, in accordance with an exemplary embodiment of the present invention. In one preferred embodiment, the computer system 700 represents an embodiment of the adaptive cruise computer 20 of FIG. 1. In another preferred embodiment, the computer system 700 is coupled to the adaptive cruise control computer 20 of FIG. 1.

Accordingly, the process 200 of FIGS. 2-7 provides improved implementation of adaptive cruise control for vehicles in various different situations. For example, in ordinary, typical day-to-day driving environments, then typical, normal go indications such as accelerator pedal or resume switch press are utilized. Specifically, under such conditions in accordance with one exemplary embodiment of the present invention, when FSRA has brought the FSRA vehicle to a stop, the accelerator pedal can be used by the driver to start the vehicle moving again. In certain embodiments, in order to increase confidence that a deliberate action is being taken (not an accidental press or a failure mode), a double press of the resume switch is required before the vehicle will start moving after FSRA has brought it to a stop. In certain other embodiments, a single press of a fixed duration (preferably longer than noise on the switch and shorter than likely to occur if leaning on the switch) is utilized with release from stop only occurring after the switch is released.

In addition, in situations in which the vehicle is stopped, driver action following disengagement is utilized. For example, in one exemplary embodiment, the driver can disengage ACC (or FSRA) by pressing the brake pedal, by turning the Cruise On/Off switch Off or by pressing the cruise cancel switch. The cruise switch disengagements (On/Off switch or Cancel switch) are preferably treated in a special way if detected while FSRA is holding the vehicle at a stop. Specifically, if the On/Off switch is detected as Off while FSRA is holding the vehicle at a stop, the driver will be notified and the vehicle will remain stopped until the driver takes control. Also in a preferred embodiment, if the Cancel switch is detected as pressed while FSRA is holding the vehicle at a stop, this disengagement will be treated as described in the following paragraph until the driver takes control and a second cancel switch press will be considered as the driver taking control.

In other situations special treatment of disengagement inputs, such as cancel switch, are utilized. For example, in a preferred embodiment, when ACC disengages for a reason other than one of the defined normal driver disengagements, then the driver is informed (via visual, audible and/or haptic indicators), powertrain control is released and brake control continues until the driver takes control or maximum time expires. FSRA preferably follows this same approach except when one of these disengagements occurs when the vehicle is stopped. In that case, the FSRA vehicle preferably will be held at a stop until the driver takes control. The driver can take control by pressing the accelerator pedal, pressing the brake pedal, applying the electric park brake or shifting the transmission to park.

In the embodiment depicted in FIG. 8, the computer system 700 includes a processor 702, a memory 704, a computer bus 706, an interface 708, and a storage device 710. The processor 702 performs the computation and control functions of the computer system 700 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 702 executes one or more programs 712 preferably stored within the memory 704, the storage device 710, and/or another computer-readable medium, and, as such, controls the general operation of the computer system 700. In so doing, the processor 702 and/or such program products preferably execute steps of one or more processes, such as the process 200 of FIGS. 2-7 and/or various steps thereof, in accordance with one exemplary embodiment of the present invention.

As referenced above, the memory 704 stores a program or programs 712 that execute one or more embodiments of processes such as the process 200 of FIGS. 2-7 and/or various steps thereof, and/or other processes. The memory 704 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 704 may be a single type of memory component, or it may be composed of many different types of memory components. In addition, the memory 704 and the processor 702 may be distributed across several different computers that collectively comprise the computer system 700. For example, a portion of the memory 704 may reside on a computer within a particular apparatus or process, and another portion may reside on a remote computer.

The computer bus 706 serves to transmit programs, data, status and other information or signals between the various components of the computer system 700. The computer bus 706 can be any suitable physical or logical means of connecting computer systems and components. This includes, but is not limited to, direct hard-wired connections, fiber optics, infrared and wireless bus technologies. The interface 708 allows communication to the computer system 700, for example from a vehicle occupant, a system operator, and/or another computer system, and can be implemented using any suitable method and apparatus.

The storage device 710 can be any suitable type of storage apparatus, including direct access storage devices such as hard disk drives, flash systems, floppy disk drives and optical disk drives. In one exemplary embodiment, the storage device 710 is a program product from which memory 704 can receive a program 712 that executes one or more embodiments of the process 200 of FIGS. 2-7 and/or various steps thereof as described in greater detail further below. In one preferred embodiment, such a program product can be implemented as part of, inserted into, or otherwise coupled to the computer system 700. As shown in FIG. 8, the storage device 710 can comprise a disk drive device that uses disks 714 to store data. As one exemplary implementation, the computer system 700 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 714), and transmission media such as digital and analog communication links. It will similarly be appreciated that the computer system 700 may also otherwise differ from the embodiment depicted in FIG. 8, for example in that the computer system 700 may be coupled to or may otherwise utilize one or more remote computer systems and/or other control systems.

Accordingly, in accordance with exemplary embodiments of the present invention, improved methods, program products, and systems are provided for implementing adaptive cruise control for vehicle. For example, the improved methods, program products, and systems help to ensure that only pre-defined deliberate driver actions allow the FSRA system to release the brake hold and/or that helps to ensure that failure modes are not inadvertently interpreted as valid driver actions leading to release of FSRA from a stop.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for implementing adaptive cruise control for a vehicle for resuming motion of the vehicle after the adaptive cruise control has stopped the vehicle, the method comprising the steps of:

determining whether a driver of the vehicle has taken a deliberate action to move the vehicle, the deliberate action comprising an engagement of a resume switch for the adaptive cruise control for a predetermined amount of time; and moving the vehicle, on the condition that the driver has taken the deliberation action to move the vehicle.

2. The method of claim 1, further comprising the steps of:
determining a driving condition;
determining one or more inputs from the driver; and
determining whether the driver has taken the deliberate action, based at least in part on the driving condition and the one or more inputs from the driver.

3. The method of claim 2, wherein:
the step of determining a driving condition comprises the step of:
determining whether a full speed range adaptive cruise control is engaged; and
the step of determining whether the driver has taken the deliberate action comprises the step of:
determining whether the driver has taken the deliberate action, based at least in part on whether the full speed range adaptive cruise control is engaged and the one or more inputs from the driver.

4. The method of claim 1, further comprising the step of:
determining whether the vehicle is being held by another system;
wherein the step of moving the vehicle further comprises the step of:
moving the vehicle, on the further condition that the vehicle is not being held by another system.

5. A program product for implementing adaptive cruise control for a vehicle for resuming motion of the vehicle after the adaptive cruise control has stopped the vehicle, the program product comprising:
a program configured to at least facilitate:
determining whether a driver of the vehicle has taken a deliberate action to move the vehicle, the deliberate action comprising an engagement of a resume switch for the adaptive cruise control two or more times for a predetermined amount of time each; and
moving the vehicle, on the condition that the driver has taken the deliberation action to move the vehicle; and
a non-transitory computer-readable storage medium storing the program.

6. The program product of claim 5, wherein the program is further configured to at least facilitate:
determining a driving condition;
determining one or more inputs from the driver; and
determining whether the driver has taken the deliberate action, based at least in part on the driving condition and the one or more inputs from the driver.

7. The program product of claim 6, wherein the program is further configured to at least facilitate:
determining whether a full speed range adaptive cruise control is engaged; and
determining whether the driver has taken the deliberate action, based at least in part on whether the full speed range adaptive cruise control is engaged and the one or more inputs from the driver.

8. The program product of claim 5, wherein the program is further configured to at least facilitate:
determining whether the vehicle is being held by another system; and
moving the vehicle, on the further condition that the vehicle is not being held by another system.

9. A computer system for implementing adaptive cruise control for a vehicle for resuming motion of the vehicle after the adaptive cruise control has stopped the vehicle, the computer system comprising:
a memory configured to store an adaptive cruise control program, the adaptive cruise control program configured to at least facilitate:
determining whether a driver of the vehicle has taken a deliberate action to move the vehicle, the deliberate action comprising engagement of a resume switch for the adaptive cruise control two or more times for a predetermined amount of time each; and
moving the vehicle, on the condition that the driver has taken the deliberation action to move the vehicle; and
a processor coupled to the memory and configured to execute the adaptive cruise control program.

10. The computer system of claim 9, wherein the adaptive cruise control program is further configured to at least facilitate:
determining a driving condition;
determining one or more inputs from the driver; and
determining whether the driver has taken the deliberate action, based at least in part on the driving condition and the one or more inputs from the driver.

11. The computer system of claim 10, wherein the adaptive cruise control program is further configured to at least facilitate:
determining whether a full speed range adaptive cruise control is engaged; and
determining whether the driver has taken the deliberate action, based at least in part on whether the full speed range adaptive cruise control is engaged and the one or more inputs from the driver.

12. The computer system of claim 9, wherein the adaptive cruise control program is further configured to at least facilitate:
determining whether the vehicle is being held by another system; and
moving the vehicle, on the further condition that the vehicle is not being held by another system.

13. The method of claim 1, wherein the deliberate action comprises engagement of the resume switch for the adaptive cruise control for two or more times for at least a first predetermined amount of time each, and wherein each of the two or more times occurs within a second predetermined amount of time of one another.

14. The program produce of claim 5, wherein the deliberate action comprises engagement of the resume switch for the adaptive cruise control for two or more times for at least a first predetermined amount of time each, and wherein each of the two or more times occurs within a second predetermined amount of time of one another.

15. The computer system of claim 9, wherein the deliberate action comprises engagement of the resume switch for the adaptive cruise control for two or more times for at least a first predetermined amount of time each, and wherein each of the two or more times occurs within a second predetermined amount of time of one another.

* * * * *